United States Patent [19]

Legue et al.

[11] Patent Number: 4,569,972
[45] Date of Patent: Feb. 11, 1986

[54] ADHESIVE CONSISTING ESSENTIALLY OF A RICINOLEATE URETHANE POLYOL AND A CHLORINATED POLYVINYL CHLORIDE

[75] Inventors: Norris R. Legue, Scotch Plains; Myron Shapiro, Rockaway, both of N.J.

[73] Assignee: Synthetic Surfaces, Inc., Scotch Plains, N.J.

[21] Appl. No.: 668,303

[22] Filed: Nov. 5, 1984

Related U.S. Application Data

[63] Continuation of Ser. No. 317,120, Nov. 2, 1981, abandoned.

[51] Int. Cl.$^4$ .................... C08F 27/24; C08L 75/06
[52] U.S. Cl. .................................. 525/129; 525/131
[58] Field of Search .......................... 525/129, 131

[56] References Cited

U.S. PATENT DOCUMENTS

| | | | |
|---|---|---|---|
| 3,513,118 | 5/1970 | Legue et al. | 525/129 |
| 3,632,533 | 1/1972 | Winkler | 525/129 |
| 4,272,464 | 6/1981 | Asai et al. | 525/129 |

FOREIGN PATENT DOCUMENTS 0718472  3/1980  U.S.S.R. .................... 525/129

Primary Examiner—John C. Bleutge
Assistant Examiner—Robert E. L. Sellers
Attorney, Agent, or Firm—John N. Bain

[57] ABSTRACT

An adhesive composition consisting essentially of a solution in a suitable solvent of a ricinoleate urethane polyol and a chlorinated polyvinyl chloride in which the chlorinated polyvinyl chloride represents no more than approximately 90% by weight of the combined polyol and chlorinated polyvinyl chloride.

21 Claims, No Drawings

ADHESIVE CONSISTING ESSENTIALLY OF A RICINOLEATE URETHANE POLYOL AND A CHLORINATED POLYVINYL CHLORIDE

This is a continuation of application Ser. No. 317,120, filed Nov. 2, 1981, now abandoned.

BACKGROUND OF THE INVENTION

Ricinoleate urethane polyols are well known in the art for use in the formulation of adhesives and coatings as plasticizers, pigment dispersing agents and tackifiers as well as a reactive ingredient.

Ricinoleate urethane polyols themselves vary in consistency from high viscosity oils to greases and, while they have some tack, they lack cohesive strength. Thus, they are not employed alone as pressure sensitive adhesives or contact cement nor do they impart cohesive strength to adhesives when used as tackifiers.

Two-package urethane adhesives which cure by the reaction of the hydroxyl groups of the ricinoleate urethane polyol with an isocyanate are strong adhesives when cured but exhibit very little green strength. "Green strength" as used herein means the ability to hold two surfaces together when first contacted and before the adhesive develops its ultimate bonding properties when fully cured.

The degree of green strength exhibited by an adhesive is vital to many applications. High green strength tends to prevent wrinkling and slippage of films during lamination. In panel assembly and packaging, it permits faster handling and wrapping. When an adhesive is applied to a vertical surface, a sufficiently high green strength prevents a mechanically unsupported, bonded member from slipping under the influence of gravity. When employed for flocking, high green strength holds fibers in place while the adhesive cures and in the laying of carpet or synthetic flooring, it resists curling due to the shape-memory thereof acquired when stored in a roll.

Two-package urethane coatings which cure by the same reaction as set forth above with respect to adhesives have good flexibility and toughness but develop film hardness slowly. It is preferable that floor coatings develop hardness sufficient to accept traffic rapidly to minimize down-time whether the coating be used on new construction or existing sites.

Additionally, when urethane coatings and adhesives are applied to concrete, it is currently necessary to acid-etch the concrete prior to application. While acid-etching of the concrete is a prerequisite for excellent adhesion, a higher degree of adhesion to concrete that has not been acid-etched is always desirable by virtue of the fact that when large areas are acid-etched frequently portions thereof are either missed or inadequately etched resulting in poor adhesion.

In accordance with the present invention, it has been found that a mixture of ricinoleate urethane polyol and chlorinated polyvinyl chloride (CPVC) exhibits a unique combination of properties which are not achievable if either product is employed alone or if either product were omitted from certain formulations containing other ingredients. Chlorinated polyvinyl chloride is known for its excellent adhesion to rigid polyvinyl chloride, high tensile strength and inherent flexibility but not as a product known to convert a ricinoleate urethane polyol from a product with little tack and cohesiveness to one that is tenacious as claimed in the present invention.

A chlorinated polyvinyl chloride/ricinoleate urethane polyol mixture in accordance with the present invention is useful in the formulation of pressure sensitive and curable adhesives, contact cements, protective coatings, curable urethanes and curable coatings. Such mixtures are also useful as tackifying additives, anti-slip additives, flexibilizing agents, cross-linking agents, adhesion improvers and the like. The term "adhesive" as used herein is intended to include broadly, adhesives, coatings and all other uses to which the combination of chlorinated polyvinyl chloride and ricinoleate urethane polyol may be employed.

SUMMARY OF THE INVENTION

An adhesive composition consisting essentially of a solution in a suitable solvent of a ricinoleate urethane polyol and a chlorinated polyvinyl chloride with the chlorinated polyvinyl chloride appearing in quantities no greater than approximately 90% by weight of the combined polyol and chlorinated polyvinyl chloride.

PREFERRED EMBODIMENT OF THE INVENTION

The aforesaid objects and advantages may be achieved from a mixture of chlorinated polyvinyl chloride and a ricinoleate urethane polyol preferred embodiments of which follow.

The chlorinated polyvinyl chloride may be made by post chlorinating polyvinyl chloride resin. Merely by way of example, the following chlorinated polyvinyl chlorides may be employed in this invention: GENCLOR S, GENCLOR T manufactured by Imperial Chemical Industries Ltd, London, England and marketed in the USA by ICI United States, Inc., Wilmington, Del. and GEON 625X560, GEON 623X560 manufactured by B. F. Goodrich Chemical Group, Cleveland, Ohio.

The chlorinated polyvinyl chloride content by weight should not be more than approximately 90% of the chlorinated polyvinyl chloride/ricinoleate urethane polyol blend. This percentage excludes changes resulting from adding plasticizers, solvents, fillers and the like.

The ricinoleate urethane polyol of this invention is made by reacting an isocyanate having an average functionality of two or greater with a ricinoleate polyol having an average hydroxyl functionality of two or greater at an isocyanate/hydroxyl (NCO/OH) ratio of no greater than 0.9/1.0. The ricinoleate urethane polyol resulting from this reaction substantially has no reactive isocyanate groups but does have residual unreacted hydroxyl groups. The methods of preparation of polyol/isocyanate adducts such as the ricinoleate urethane polyol above are well known in the art and need no further explanation.

Both aromatic and aliphatic polyisocyanates can be employed to react with the ricinoleate polyol to make the ricinoleate urethane polyol of this invention. The preferred isocyanates are toluene diisocyanate (TDI) and diphenylmethane diisocyanate (MDI). Illustrative of other suitable polyisocyanates are the following: Isophorone diisocyanate (IPDI), 4,4'4" triphenylmethane triisocyanate, polymethylene polyphenyl isocyanate m-phenylene, 1-chlorophenylene 2,4 diisocyanates, methylene-bis(4-cyclohexylisocyanate) and their equivalents.

The chlorinated polyvinyl chloride may be combined with the ricinoleate urethane polyol by several methods. Merely by way of illustration and without limiting the scope of the claims hereof, some of the methods are: (a) the chlorinated polyvinyl is dissolved in the components employed in the preparation of the ricinoleate urethane polyol prior to or during the reaction process; (b) the chlorinated polyvinyl chloride is dissolved in the finished ricinoleate urethane polyol; and (c) the chlorinated polyvinyl chloride is added to the ricinoleate urethane polyol as a solution of chlorinated polyvinyl chloride dissolved in a solvent, or dissolved in a non-reactive resin or a non-reactive plasticizer or combination of the same; (d) a chlorinated polyvinyl chloride is added to the ricinoleate urethane polyol by first dissolving in isocyanates, in blocked isocyanates, in reactive phenolics, in melamine-formaldehyde, in urea-formaldehyde or other resins that will chemically react with the ricinoleate urethane polyol. In some cases when adding the chlorinated polyvinyl chloride by this method the chlorinated polyvinyl chloride would be in the part of a two-package system which reacts with the other part which is the ricinoleate urethane polyol.

The following examples are illustrative of the adhesives and coatings claimed herein:

EXAMPLE I

This example discloses the formulation, properties, performance and testing of a two-package curing urethane adhesive in accordance with the invention claimed herein. The adhesive cures by the reaction of the hydroxyl groups on the ricinoleate urethane polyol with the isocyanate terminated prepolymer.

| FORMULA | Wt. A | Wt. B | Wt. C |
|---|---|---|---|
| Part A | | | |
| Ricinoleate urethane polyol* | 35 | 35 | 35 |
| CPVC solution (20% by weight solids)** | — | 325 | — |
| Methyl Ethyl Ketone | 35 | — | — |
| Part B | | | |
| Isocyanate Terminated urethane prepolymer*** | 45.3 | 45.3 | 45.3 |
| CPVC solution (20% by weight solids)** | — | — | 325.0 |

*Castor oil/TDI adduct (88/12 by weight): having 2.1% by weight available hydroxyl expressed as 100% by weight solids; with a viscosity of 90,000 cps.
**ICI Genclor-S dissolved in MEK.
***Castor oil/MDI prepolymer having 4.1% by weight available isocyanates as a 70% by weight solids solution in methyl ethyl ketone.
Those forumlas of Parts A and B which contain CPVC, when mixed result in the same composition.

Performance—The data in Table I illustrates the improvement in green strength between the control and the adhesive of this example.

TABLE 1

| | | |
|---|---|---|
| Genclor-S (% by weight of ricinoleate urethane polyol) | 0 | 65 |
| Genclor-S (% by weight of prepolymer) | 0 | 67 |
| Genclor-S (% by weight of total solids) | 0 | 49 |
| Finger Tack | Oily | Tacky, legs |
| Green Strength (finger) | Poor | Fair |
| Green Strength*** | 0.2 | 6.5 |
| Bond Strength (7 days)**** | 6 | 10 |

****As determined by a Scott Pendulum Type Tensile Tester the readings being employed for comparative purposes.

Mixing and Test Procedure—The data listed in Table was determined in the following manner:

(A) Part A and B were mixed and allowed to stand at ambient temperature for thirty minutes before beginning to make test samples.

(B) Finger Tack—An 8 mil. wet film was cast on glass using a draw down blade. The film was given approximately a five minute open time to allow the solvent to evaporate. An index finger was pressed into the adhesive, withdrawn slowly, and based on its "feel" was rated as oily or tacky. In the latter case, a material rated as tacky not only had tack but also had a high green strength, legs and grab.

(C) Green Strength (Finger Test)—An 8 mil. wet film was cast on glass using a draw down blade. The film was given approximately five minutes open time in order to allow the solvent to evaporate. The relative green strength was determined subjectively by pressing an index finger into the adhesive and removing it slowly. A green strength rating of 1 or poor indicates that little force was necessary to remove one's finger and a rating of 10 or excellent means that a very high force was required to pull away from the glass.

(D) Green Strength (Scott Pendulum Type Tensile Tester)—A 5 mil. wet film, 1" wide and 3" long, was cast on an aluminum panel using a draw down blade. After five minutes open time to allow the solvent to evaporate, a piece of natural cotton fabric was pressed into the adhesive and rolled using a 2 pound weight. The relative green strength of this lamination was determined by immediately placing it in the Scott Pendulum Type Tensile Tester and pulling the aluminum and fabric in opposite directions (shear adhesion). The numbers recorded were direct readings from the tester with the lowest numbers being the poorest green strength and the highest numbers being the strongest.

(E) Bond Strenth—The solution was applied to two pieces of 1" wide natural cotton fabric using a paint brush. After a five minute open time to allow the solvent to evaporate, the two coated pieces of fabric were then pressed together like contact cement. After curing, the samples were subjected to a 90° Peel Strength Test using the Scott Pendulum Type Tensile Tester by pulling apart at a rate of about 2 inches/minute. The numbers shown are the direct readings from the tester with the lowest number being the weakest bond and the highest number being the strongest peel strength.

EXAMPLE II

The principal difference between the two-package curing urethane adhesive of this example and that of Example I is that a different isocyanate terminated prepolymer was employed. The test procedures were the same as in Example I.

| FORMULA | Wt. A | Wt. B |
|---|---|---|
| Part A | | |
| Ricinoleate urethane polyol* | 780 | 780 |
| CPVC solution (23% by weight solids)** | — | 178 |
| Dibutyltin dilaurate catalyst | 1 | 1 |
| Toluene | 205 | 68 |
| Part B | | |
| Isocyanate terminated urethane | 325 | 325 |

-continued

| FORMULA | Wt. A | Wt. B |
|---|---|---|
| prepolymer*** | | |

*Castor oil/TDI adduct: having 2.1% by weight available hydroxyl expressed as 100% by weight solids with a viscosity of 90,000 cps.
**ICI Genclor-S dissolved in methyl ethyl ketone (MEK).
***Mobay Chemical Mondur CB 75: Trimethylol propane/TDI prepolymer having 13.0% by molecular weight available isocyanate as a 75% by weight solids solution in ethyl acetate by weight.

Performance—The data in Table II illustrates the improvement in green strength between the adhesive of the control and that of this example.

TABLE II

| | | |
|---|---|---|
| Genclor-S, (% by weight ricinoleate urethane polyol) | 0 | 5.0 |
| Genclor-S, (% by weight total solids) | 0 | 3.9 |
| Finger Tack | Oily | Tacky, legs |
| Green Strength (finger) | Poor | Good |
| Green Strength**** | 0.2 | 0.6 |
| Bond Strength (48 hrs.)**** | 5 | 5 |

****As determined by a Scott Pendulum Type Tensile Tester; the readings being employed for comparative purposes.

EXAMPLE III

The principal difference between the adhesive of this example and that of Example II is that the ricinoleate urethane polyol in this example was made from the reaction of caster oil/MDI whereas in Example II, it was made from castor oil/TDI. The test procedures were the same as in Example I.

| FORMULA | Wt. A | Wt. B |
|---|---|---|
| Part A | | |
| Ricinoleate urethane polyol* | 1084 | 1084 |
| CPVC solution (23% by weight solids)** | — | 124 |
| Dibutyltin dilaurate catalyst | 1.0 | 1.0 |
| Part B | | |
| Isocyanate terminated urethane prepolymer*** | 325 | 325 |

*Castor oil/MDI aduct: (90/10) having 1.1% by weight theoretically available hydroxyl as a 50% by weight solids solution in methyl ethyl ketone.
**ICI Genclor-S dissolved in MEK.
***Mobay Chemical Mondur CB 75: Trimethylol propane/TDI prepolymer having 13.0% by weight available isocyanate as a 75% by weight solids solution in ethyl acetate by weight.

Performance—The data in Table III illustrates the difference in green strength between the adhesive of the control and that of this example.

TABLE III

| | | |
|---|---|---|
| Genclor-S, (% by weight of ricinoleate) | 0 | 5.0 |
| Genclor-S, (% by weight of total solids) | 0 | 3.9 |
| Finger Tack | Oily | Tacky, legs |
| Green Strength (Finger) | Poor | Good |
| Green Strength**** | 0.0 | 0.4 |
| Bond Strength (7 days)**** | 12.0 | 12.5 |

****As determined by a Scott Pendulum Type Tensile Tester; the readings being employed for comparative purposes.

EXAMPLE IV

This example discloses the formulation, properties, performance and testing of a non-curing pressure sensitive adhesive in accordance with this invention. It develops its properties when the solvent evaporates and without undergoing further chemical reaction whereas in Examples I, II, and III the adhesives cure by reaction.

| FORMULA | Wt. A | Wt. B |
|---|---|---|
| Ricinoleate urethane polyol (50% by weight solids)* | 180.0 | 180.0 |
| CPVC solution (23% by weight solids)** | — | 43.4 |

*Castor oil/MDI (84.5/15.5) adduct having 0.8% by weight theoretically available hydroxyl as a 50% by weight solids solution in MEK.
**Genclor-S dissolved in MEK.

Performance—The data in Table IV illustrates the difference in bond strength between the adhesive of the control and that of this example.

TABLE IV

| | | |
|---|---|---|
| Genclor-S, (% by weight of total solids) | 0 | 10 |
| Bond Strength*** | 0.1 | 4.0 |
| | | (Paper tears) |

***As determined by a Scott Pendulum Type Tensile Tester; the readings being employed for comparative purposes.

Test Procedure—An 8 mil. wet film was cast on clay coated paper using a draw down blade. It was then dried for ten minutes at ambient temperature and for an additional five minutes at 138° F. to drive off all of the solvent. After cooling to room temperature a 1 inch wide piece was pressed on a piece of cold rolled steel. The samples were subjected to a 180° Peel Strength Test using the Scott Pendulum Type Tensile Tester by pulling at a rate of about 12 inches/minute. The numbers shown are direct readings from the tester with the lower numbers being the weaker bond and the higher numbers being the stronger bond.

EXAMPLE V

The principal difference between the pressure-sensitive adhesive of this example and that of Example IV is that in this example the ricinoleate urethane polyol was made from an aliphatic isocyanate whereas in Example IV an aromatic isocyanate was employed. The test procedures were the same as Example IV.

| FORMULA | Wt. | Wt. |
|---|---|---|
| Ricinoleate urethane polyol* | 170 | 170 |
| CPVC solution (20% by weight solids)** | — | 75 |

*Castor oil/IPDI (86/14) adduct having 1.1% by weight theoretically available hydroxyl as a 50% by weight solids solution in methyl ethyl ketone and toluene at 1:1 by weight.
**ICI Genclor-S dissolved in MEK.

Performance—The data in Table V illustrates the difference between the control and the adhesive of this example.

TABLE V

| | | |
|---|---|---|
| Genclor-S, (% by weight of total solids) | 0 | 15 |
| Finger Tack | Oily | Moderate |
| Bond Strength*** | 0 | 1.5 |

***As determined by a Scott Pendulum Type Tensile Tester, the readings being employed for comparative purposes.

EXAMPLE VI

This example discloses a one-package, thermoplastic coating that dries by solvent evaporation. The principal difference between the coating of this example and that of Example VII is that in Example VII the coating is a two-package system that cures by reaction instead of remaining thermoplastic.

| FORMULA | Wt. |
|---|---|
| Ricinoleate urethane polyol* | 30 |
| CPVC solution (23% by weight solids)** | 87 |

*Castor oil/TDI adduct having 2.1% by weight available hydroxyl as a 100% by weight solids solution with a viscosity of 90,000 cps.
**ICI Genclor-S dissolved in MEK.

Performance—The data in Table VI illustrates that composition of this invention can be employed to make a one-package thermoplastic coating that dries by solvent evaporation.

TABLE VI

| Genclor-S, (% by weight solids) | 40 |
|---|---|
| Hardness (Sward Rocker), 24 hour dry*** | 4 |
| Water spot test*** | A |
| 95% ethyl alcohol spot test*** | A |

Test Procedure—***An 8 mil. wet film was cast on glass using a draw down blade. After an overnight dry, the sward hardness was determined. Resistance to attack from splashing chemicals was determined by putting two drops of the liquid test solution on the film and rubbing lightly with a finger. If there was no noticeable softening or change in appearance, the film was rated "A" for acceptable.

EXAMPLE VII

The principal difference between the two-package system of this example and Example II is that in this example the formulation is evaluated as a coating whereas Example II was evaluated as an adhesive.

| FORMULA | Wt. A | Wt. B | Wt. C |
|---|---|---|---|
| Part A | | | |
| Ricinoleate urethane polyol* | 780 | 780 | 780 |
| CPVC solution (23% by weight solids)** | — | 1453 | 2260 |
| Toluene | 1170 | — | — |
| Dibutyltin dilaurate catalyst | 1.0 | 1.0 | 1.0 |
| Part B | | | |
| Isocyanate terminated prepolymer*** | 325 | 325 | 325 |

*Castor oil/TDI adduct having 2.1% by weight available hydroxyl as 100% by weight solids with a viscosity of 90,000 cps.
**ICI Genclor-S dissolved in MEK.
***Mobay Chemical Mondur CB 75: Trimethylol propane/TDI prepolymer having 13.0% by weight available isocyanate as a 75% by weight solids solution in ethyl acetate by weight.

Performance—The data in Table VII illustrates the improvement in film hardness and improvement in concrete adhesion of the coating of this example as compared to that of the control.

TABLE VII

| Genclor-S, (% by weight of ricinoleate urethane polyol) | 0 | 30 | 60 |
|---|---|---|---|
| Genclor-S, (% by weight of total solids) | 0 | 25 | 34 |
| Hardness (Sward Rocker), 4 hours | 0 | 3 | 6 |
| Hardness (Sward Rocker), 24 hours | 4 | 8 | 18 |
| Wet concrete adhesion | Poor | Fair | Fair |

Mixing and Test Procedure—The data listed in Table VII was determined in the following manner:

(A) Part A and Part B were mixed and allowed to stand at ambient temperature for approximately thirty minutes before beginning to make test samples.

(B) Hardness—An 8 mil. wet film was cast on glass using a draw down blade. After allowing an air dry for the time indicated in the table, the hardness was determined using a Sward Rocker; the higher the number the greater the hardness.

(C) Wet Concrete Adhesion—The solution was brushed on a block of concrete and allowed to cure at room temperature for 3 days. The block was then immersed in water for 24 hours. The adhesion was determined subjectively by picking at it with a knife point.

EXAMPLE VIII

The principal difference between the coatings of this example and that of Example VI is that the chlorinated polyvinyl chlorides of this example are from another manufacturer.

| FORMULA | Wt. A | Wt. B |
|---|---|---|
| Ricinoleate urethane polyol (50% by weight solids)* | 20 | 20 |
| CPVC solution (20% by weight solids)** | 116 | — |
| CPVC solution (20% by weight solids)*** | — | 116 |

*Castor oil/TDI adduct having 2.1% by weight available hydroxyl as a 100% by weight solids solution with a viscosity of 90,000 cps. mixed with tetrahydrofuran (THF).
**B. F. Goodrich Geon 625X560 dissolved in tetrahydrofuran (THF).
***B. F. Goodrich Geon 623X560 dissolved in tetrahydrofuran (THF).

Performance—The data in Table VIII are additional illustrations of compositions of this invention that can be employed as one-package thermoplastic coatings that dry by solvent evaporation.

TABLE VIII

| CPVC solution (% by weight solids) | 70 | 70 |
|---|---|---|
| Hardness (Sward Rocker), 24 hour dry**** | 30 | 30 |
| Water spot test**** | A | A |
| 95% ethyl alcohol spot test**** | A | A |
| 20% hydrochloric acid spot test**** | A | A |

****The test procedure was the same as Example VI.

It will be understood by those skilled in the art that many modifications and variations of the present invention may be made without departing from the spirit and the scope thereof.

What is claimed is:

1. An adhesive composition consisting essentially of
   (a) a ricinoleate urethane polyol, and
   (b) a chlorinated polyvinyl chloride appearing in quantities no greater than approximately 90% by weight of the combined polyol and chlorinated polyvinyl chloride.

2. An adhesive composition in accordance with claim 1 in which
   (a) the ricinoleate urethane polyol is prepared from reacting an isocyanate having a functionality of at least 2 with a ricinoleate polyol having a functionality of at least 2 at an isocyanate to hydroxyl ratio (NCO/OH) no greater than approximately 0.9/1.0.

3. An adhesive composition in accordance with claim 2 in which
   (a) the ricinoleate urethane polyol is prepared by reacting a ricinoleate polyol with diphenylmethane diisocyanate.

4. An adhesive composition in accordance with claim 2 in which (a) the ricinoleate urethane polyol is prepared by reacting a ricinoleate polyol with methylene-bis(4-cyclohexylisocyanate).

5. An adhesive composition in accordance with claim 2 in which
   (a) the ricinoleate urethane polyol is prepared by reacting a ricinoleate polyol with isophorone diisocyanate.

6. An adhesive composition in accordance with claim 1 in which
   (a) the chlorinated polyvinyl chloride is prepared by post chlorinating a polyvinyl chloride resin.

7. An adhesive composition in accordance with claim 2 in which
   (a) the ricinoleate urethane polyol is prepared by reacting a ricinoleate polyol with toluene diisocyanate.

8. An adhesive composition in accordance with claim 6 in which
   (a) the ricinoleate urethane polyol is prepared by reacting a ricinoleate polyol with diphenylmethane diisocyanate.

9. An adhesive composition in accordance with claim 6 in which
   (a) the ricinoleate urethane polyol is prepared by reacting a ricinoleate polyol with methylene-bis(4-cyclohexylisocyanate).

10. An adhesive composition in accordance with claim 6 in which
    (a) the ricinoleate urethane polyol is prepared by reacting a ricinoleate polyol with isophorone diisocyanate.

11. An adhesive composition in accordance with claim 1 in which
    (a) the ricinoleate urethane polyol is prepared by reacting a ricinoleate polyol with toluene diisocyanate.

12. An adhesive composition in accordance with claim 1 in which
    (a) the ricinoleate urethane polyol is prepared by reacting a ricinoleate polyol with diphenylmethane diisocyanate.

13. An adhesive composition in accordance with claim 1 in which
    (a) the ricinoleate urethane polyol is prepared by reacting a ricinoleate polyol with methylene-bis(4-cyclohexylisocyanate).

14. An adhesive composition in accordance with claim 1 in which
    (a) the ricinoleate urethane polyol is prepared by reacting a ricinoleate polyol with isophorone diisocyanate.

15. An adhesive composition in accordance with claim 1 in which
    (a) the ricinoleate urethane polyol is prepared by reacting an isocyanate having a functionality of at least 2 with castor oil.

16. An adhesive composition in accordance with claim 15 in which
    (a) the ricinoleate urethane polyol is prepared from reacting castor oil with diphenylmethane diisocyanate.

17. An adhesive composition in accordance with claim 15 in which
    (a) the ricinoleate urethane polyol is prepared from reacting castor oil with toluene diisocyanate.

18. An adhesive composition in accordance with claim 15 in which
    (a) the ricinoleate urethane polyol is prepared from reacting castor oil with isophorone diisocyanate.

19. An adhesive composition in accordance with claim 15 in which
    (a) the ricinoleate urethane polyol is prepared by reacting methylene-bis(4-cyclohexylisocyanate) with castor oil.

20. An adhesive composition in accordance with any one of claims 1, 2, 3, 4, 5, 6, 7, 8, 9, 10, 11, 12, 13, 14, 15, 16, 17, 18, or 19 and
    (a) a composition capable of cross-linking the ricinoleate urethane polyol.

21. An adhesive composition in accordance with claim 20 in which
    (a) the said composition capable of cross-linking is an isocyanate having a functionality of at least 2.

* * * * *